United States Patent Office 3,078,224
Patented Feb. 19, 1963

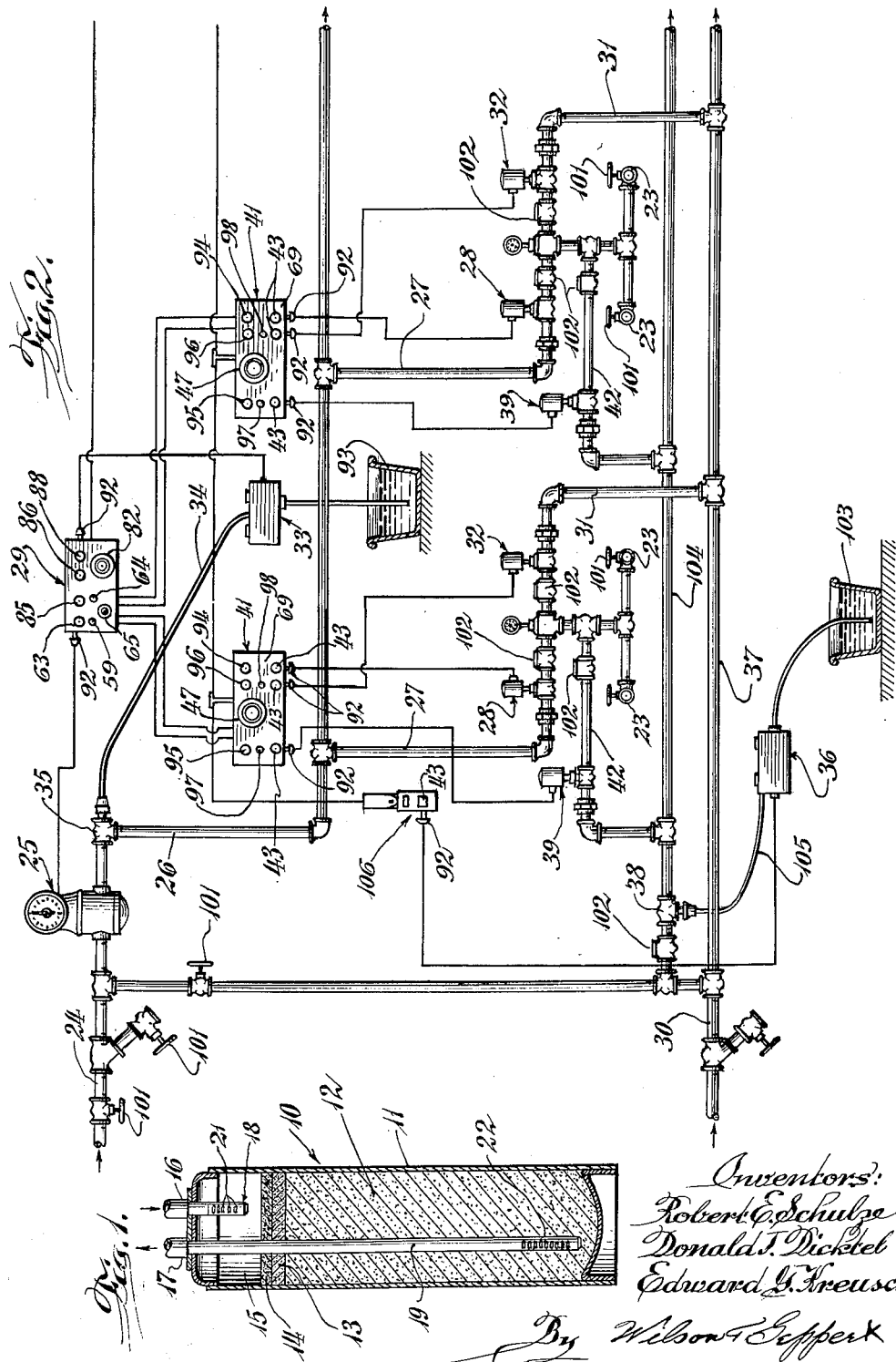

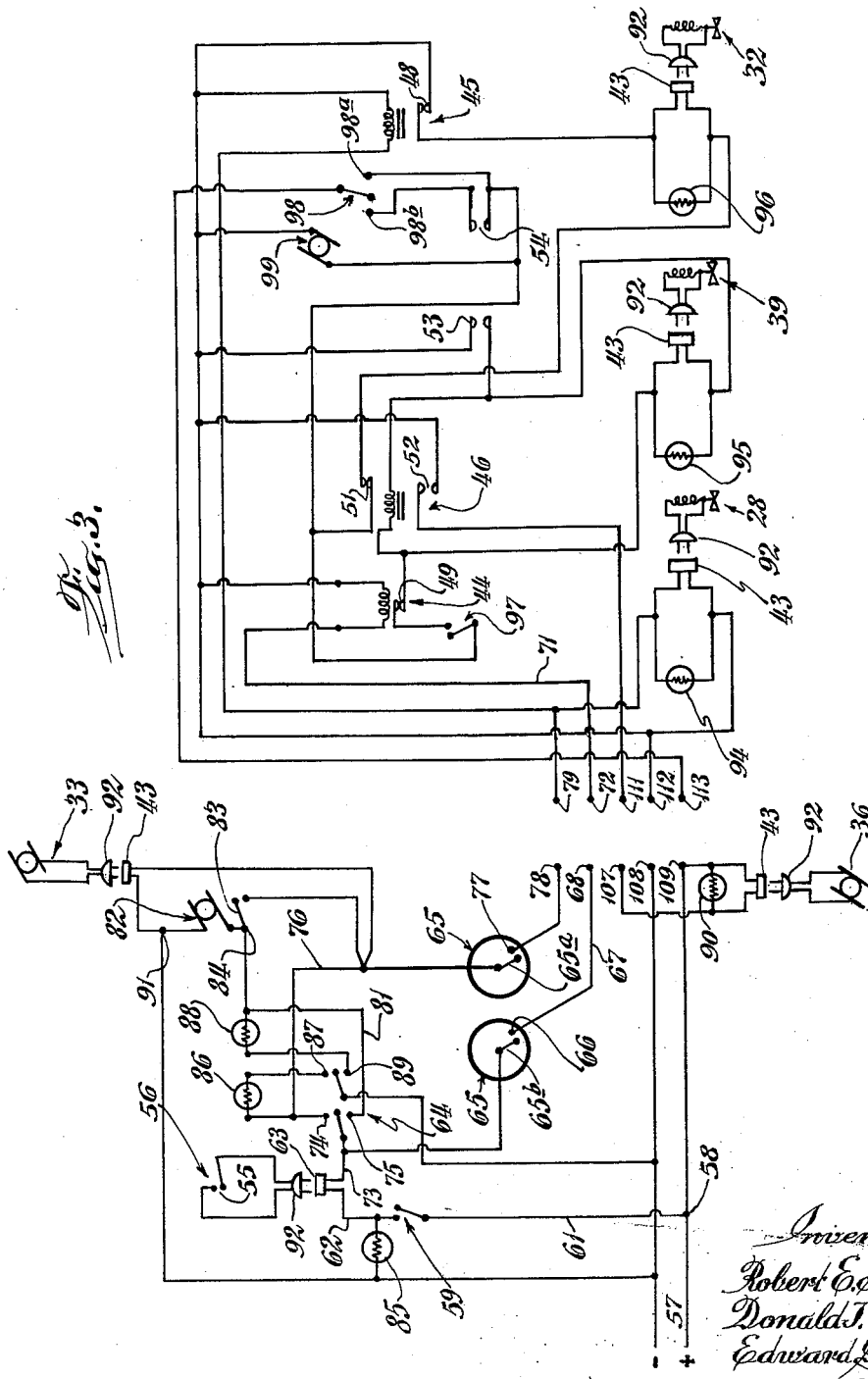

3,078,224
HYDROSULFITE AND CHLORINE TREATMENT OF ION EXCHANGE MATERIAL IN AN IRON REMOVAL UNIT
Robert E. Schulze, Deerfield, Donald J. Dicktel, Mount Prospect, and Edward G. Kreusch, Arlington Heights, Ill., assignors to Culligan, Inc., Northbrook, Ill., a corporation of Delaware
Filed Oct. 2, 1958, Ser. No. 764,972
4 Claims. (Cl. 210—30)

The present invention relates primarily to a novel iron removal unit and to a novel process and system for treating ion exchange materials in said unit for repeated use in the removal of iron from iron bearing waters.

Most water supplies contain iron in one or more forms. It may exist as a soluble iron salt, or it may be colloidal or precipitated as an iron hydroxide or oxide, and in some instances it may be associated with a highly objectionable iron bacteria.

Basically, this iron exists in iron bearing water in the following three general forms:

(a) Soluble iron—usually ferrous bicarbonate which is not visibly apparent in the supply;

(b) Freshly precipitated ferric hydroxide which is usually formed during passage of the water from its source to the point of use; and (c) Iron oxide which may be either the product of corrosion of iron pipe or may be formed from ferric hydroxide as a result of an aging process.

Water containing only soluble iron is normally clear and colorless and iron is not evident until it is converted to one of the insoluble forms, generally due to its contact with air either in the system or when water is drawn from the faucet and permitted to stand. As but a small quantity of oxygen is required to oxidize a considerable amount of iron, it is readily apparent that only a small amount of air in the system can oxidize a considerable amount of iron. Furthermore, while soluble iron can be removed with cation exchangers in a water conditioning unit and in turn may be removed during regeneration when soluble iron may be readily converted into insoluble iron, problems frequently arise in the regeneration of the ion exchange materials in completely ridding the unit of this iron.

Water containing freshly precipitated iron has the usual reddish-brown color which is generally associated with iron-bearing waters. This form of iron (ferric hydroxide) is gelatinous in nature and, while it may be removed by filtration, it is not removed by ion exchange when passing through a water conditioning or softening unit but rather is held physically by the ion exchange material and its accumulation eventually causes so-called color-throw. As this form of iron is physically held by the ion exchange material, conventional regeneration methods have no effect on its removal and it cannot be successfully and completely removed during backwashing of the unit, so that color-throw will eventually result.

Iron oxide or the completely oxidized soluble form also has the characteristic red-brown color but is unlike the freshly precipitated iron in that it is more dense and is not gelatinous. While a substantial portion of this form of iron can sometimes be removed by filtration, finely divided or colloidal particles thereof may pass through the exchanger in the water conditioning unit and into the effluent, and even though much of this form of iron may be removed by backwashing, density difference between it and the ion exchange material frequently permits some of this iron oxide to work to the bottom of the bed where it accumulates and remains in the unit with the result that the effluent from the conditioning unit will throw color. Furthermore, conventional regeneration methods will not remove this form of iron.

Regardless of the form in which the iron exists, it is highly objectionable from a domestic, commercial and industrial standpoint in that it causes discoloration of household fixtures, stains on laundry, and commercially it can interfere with chemical and process reactions; etc.

While various methods have been employed in attempts to remove iron from water supplies and such methods have had a fair amount of success in installations for industrial and commercial use, due to the high cost of equipment and treatment such installations and methods are not practical in the domestic field.

Industrially, iron may be removed by oxidizing with air or other oxidizing compounds, such as chlorine. This causes a precipitation of the contained iron as an iron oxide or hydroxide which may then be removed by filtration. Chlorination followed by filtration has also been attempted on domestic supplies, but the cost of equipment for such removal is exceedingly expensive for it requires both a chlorine feeder and a filter. Furthermore, when water is treated by aeration or chlorine, there is the further objection in that water which is non-corrosive may become exceedingly corrosive through absorption of oxygen compounds.

Iron control in water supplies has also been attempted with some degree of success by the use of sequestering agents, but the equipment necessary here is also quite expensive since proper control of the feeding of the sequestering agents must be maintained and this comprehends a chemical feed pump. Also control of iron by sequestering agents has certain objections since retention under heat, such as in a hot water heater, may cause deterioration of the sequestering agents whereupon the iron is no longer stabilized and again becomes objectionable. Furthermore, the high cost of sequestering agents makes their use uneconomical in the treatment of domestic supplies.

While soluble iron has been removed by ion exchange in which this form of iron is picked up by exchange, many problems have arisen. Precipitated iron which is associated with soluble iron in most cases is filtered out on top of the bed of ion exchange materials. As the bed of ion exchange materials is in service operation, iron retained by ion exchange has the mobility or freedom to move about within the bed as other ions seek to displace it and this iron may become oxidized or hydrolyzed with dissolved oxygen or alkalinity in the water. Also precipitated iron collected on the surface of the ion exchange bed may gradually sift and percolate down through the exchange material. The net result of these actions is an encrustation of iron oxide surrounding each particle of ion exchange material. Furthermore, encrustation may occur during the rejuvenation process as iron is being eluted from the bed with a rejuvenating agent, such as salt solution in the case of hardness removal and reactivation. Oxygen in this solution also causes precipitation of iron and certain alkaline conditions in the rejuvenation solution also encourages precipitation of iron. Another contributing factor to precipitation is the use of chlorine compounds for sanitation purposes which cause an iron oxide precipitaiton as they contact iron in the ion exchange bed.

Although an ion exchange bed may operate satisfactorily on iron bearing waters during the first few cycles, as the iron builds up within the bed objectionable properties appear. Through relatively slight agitation of the ion exchange bed, which may be due merely to a variation in water pressure and flow, the ion exchange particles in contacting or rubbing together release into the water some of the encrusted iron as very fine or small particles which percolate completely through the bed of minerals and appear in the discharged water supply lines. These cause spotting of fixtures and staining of laundry. As the accumulation of iron increases on the ion exchange materials, such encrustation interferes with the ion exchange action and reduces its ability to remove iron or soften or condition the water supply. Losses of ion exchange capacity frequently run as high as 40%.

Where encrustation proceeds to a point where it causes customer complaints, an emergency treatment with hydrochloric acid may be used to dissolve the iron oxide. However, the equipment must be capable of handling such a corrosive chemical and its use requires special treatments with neutralizing agents and rejuvenating agents, such as sodium hydroxide, soda ash or sodium chloride, to return the exchanger to a suitable operating condition. Other milder acids, phosphates and chelating agents have been proposed as cleaning agents, but they have been unsatisfactory and in many instances give drastic results as the iron oxide compounds have merely been softened in the process and subsequent service operation of the water conditioning unit causes their release into the water supplies being treated.

The present iron removal unit, process of reactivation or rejuvenation and control system has been developed to alleviate the problems involved in the removal of iron from iron-bearing waters and to successfully remove the iron in whatever form it may be present by the use of ion exchange materials. The treatment occurs within a single receptacle or unit and in service requires no additional feeders or pretreating means.

It is, therefore, an important object of the present invention to provide a novel iron removal unit, process and system for the removal of both soluble and precipitated iron by means of ion exchange materials, and whereby a substantial reduction in iron oxide release or color throw and loss of ion exchange capacity is effected.

The present invention further comprehends that water treated in accordance with the novel iron removal process does not add to the corrosiveness of the water being treated, and that the means and process employed may be successfully applied to a number of different types of ion exchange materials.

Another important feature of the present invention is that bactericidal compounds may be employed on top of the ion exchange bed to successfully combat the adverse action of iron bacteria in water supplies.

For proper performance of rejuvenation, the present invention comprehends a novel control system whereby each step in the process is automatically performed to assure that these steps are performed in a predetermined sequence and manner and that proper concentration and application time of the chemicals employed are maintained. The controls employed are so constructed and arranged in the novel system as to provide for most effective and simple maintenance, including multiple signal lights whereby to identify the process step being performed.

Another important object of the present invention is to provide a novel iron control system and process in which the ion exchange materials can be successfully employed, for the treatment of iron containing waters, without any significant degree of contamination. By means of this novel system only a single iron removal unit containing all of the treating materials is required and this without any pretreatment.

In the broad aspect of the present invention, precipitated iron is removed in the iron control unit by filtration and soluble iron is removed by ion exchange with the filter material being such that it has the proper hydraulic density and may be readily and easily removed from the iron exchange bed merely by backwashing. The hydraulic density of the filter material is such that it will not settle significantly firm without water flow, whereby it is introduced into the water conditioning unit prior to transportation of this unit to its place of use without causing a solid matrix to form that might be disturbed or broken during transportation.

Other important features of the present invention are that in the regeneration or rejuvenation process of the control system the brine solution includes a reducing agent to remove oxygen present, and also have a solubilizing effect on any iron that may have hydrolized or oxidized in the ion exchange bed prior to regeneration; that the chlorinated water rinse employed is delayed until after the brining period; that the controls for the chlorinated water period may be varied through a substantial range; and that chlorination is followed by a fresh water rinse to eliminate chlorinated water from the water conditioning unit.

A further important object of the present system and process is in the provision of a novel brine control diluting means in which the flow rate of the brine does not affect its dilution, whereby the number of water conditioning units being treated may vary from time to time without causing any variation in the concentration of the brine. In this novel system, the final mixing of brine and water for dilution occurs in the upper portion of the iron removal and water conditioning unit.

The present invention further comprehends a novel iron control unit in which a bactericidal bed may be added to the surface of the ion exchange bed for control of iron bacteria, when necessary.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in vertical cross section through an iron control exchange unit as contemplated by the present invention.

FIG. 2 is a view in front elevation of an illustrative embodiment of a plumbing and maintenance system for a regeneration plant for automatically carrying out the process of rejuvenation of one or more of the iron control exchange units.

FIG. 3 is a wiring diagram of the system of FIG. 2.

Referring more particularly to the disclosure in the drawings and to the novel illustrative embodiment of an iron control exchange unit for treating or conditioning iron bearing waters and to the novel system and process for regenerating or rejuvenating the bed of materials in said unit, the iron control exchange unit 10 comprises a portable service tank 11 adapted to be installed in a home or other place where iron removal from the water supply is to be attained with a minimum of equipment. In this tank is a loose and relatively deep bed 12 of ion exchange material upon the upper surface of which is provided a layer of filter material 13 and/or a layer of a bactericidal filter material 14, with sufficient space available below the top of the tank to provide a free board 15.

The bed 12 of minerals or treating material in the tank is an ion exchanger of the resinous or siliceous type which during the ion exchange, treating and conditioning operation, tends to become inactivated resulting in a reduction in the quality of the effluent. When the quality of the effluent reaches a point where it is no longer suitable for the intended purpose of iron removal and water conditioning, the bed of treating material requires reactivation or rejuvenation. The service tank 11 employed is of the portable type so that the unit may be readily removed for reactivation and replacement by a similar reactivated unit so that the user is assured of a continuous supply of treated or conditioned water.

To permit such ready assembly, removal and replacement the service tank 11 is provided with readily attachable and detachable slip couplings or fittings at 16 and 17, the coupling 16 being connected to a depending inlet manifold 18 through which the water to be treated enters and the coupling 17 to a depending outlet tube or manifold 19. The inlet manifold 18 is closed at its lower end which terminates in the free board space 15 above the bed of materials in the tank 11, and above its closed end this inlet manifold is provided with relatively narrow slots 21 for the uninterrupted flow therethrough of the entering untreated water. The water to be treated flows downwardly through the bed of treating materials and the treated water exits through a finely slotted strainer section 22 of the outlet tube which projects downwardly into the bed of materials adjacent the bottom of the tank and is also closed at its lower end. This strainer section prevents ion exchange or treating material from entering the outlet tube, the treated water flowing upwardly through the outlet tube and coupling 17 into the service lines for use.

In its passage through the bed of treating materials, precipitated iron in the iron bearing water is collected on the top of the filter material 13 and/or bactericidal filter 14. The filtered water or solution containing soluble iron then enters the bed 12 of ion exchange material where iron and/or hardness in the water is exchanged in the bed, after which the treated water enters the household supply or service lines for use.

When the unit 10 is no longer capable of removing iron to produce the quality of effluent intended or desired, the unit with its contents is removed to a central regeneration or rejuvenation plant where it is treated to remove the accumulation of iron and prepare it for a subsequent service period.

At the regeneration plant the first step in reactivation of the unit consists in backwashing wherein the normal flow of water is reversed to facilitate removal of the accumulated matter, filter material 13 and/or the bactericidal material 14 from the top of the ion exchange minerals or material 12. This is accomplished by removing the slotted inlet manifold 18 and connecting thereto a receptacle for receiving the minerals 12 as they are washed from the tank 11. A water supply line for back-flushing the tank is connected to the outlet tube 19 for supplying water through the fine slots of the strainer 22 at the bottom of the outlet tube to the bottom of the tank 11.

In this backwashing operation, the filter and/or bactericidal materials 13 and 14 are removed from the tank along with turbidity and precipitated iron, and after these materials are floated from the top of the bed 12 and removed with the waste water, only the bed 12 of ion exchange material is permitted to settle back into the tank 11 for further treatment.

As disclosed in FIG. 2, multiple units are rejuvenated after backwashing with each connected through a tube from one of a plurality of station outlets 23 to its inlet. In this rejuvenation process, a brine solution from a suitable brine supply enters the pipe 24, flows through a brine or batch meter 25 and into a brine header 26, from where it flows through branch lines 27, brine solenoid valve 28 and a station outlet 23 connected to an iron removal unit 10.

The quantity of brine solution supplied is controlled by the batch meter 25 with the quantity sufficient for removal of a substantial amount of iron from the ion exchange material 12. The concentration of the brine is controlled by means of a diluting device in a master control 29. Dilution of the brine is effected by alternately controlling the injection of concentrated brine through a branch line 27 and solenoid valve 28 and with diluting soft water supplied through a branch line 31 and a water solenoid valve 32 with the dilution controlled by varying the ratio of the time that the brine solenoid valve 28 and the water solenoid valve 32 are opened.

The brine for rejuvenation is treated with a reducing agent, such as sodium hydrosulfite, fed in a precise or controlled quantity from a feeder 33, through a tube 34 connected with the brine header 26 at a junction T 35, with the reducing agent being fed during the entire brine flowing period.

The concentration of the brine used in this rejuvenation process is preferably from approximately 50% to 75% of saturation, although good results have been obtained employing a concentration of more than 40% of saturation. The period of contacting the ion exchange material with the brine solution is preferably from approximately 30 to 60 minutes. While such contact may extend over a longer period than that designated, it is not necessary and merely increases the cost of this operation.

The brining period, which will be understood as hereinafter including the treatment with a reducing agent, is then followed by a chlorination rinse period for sanitation and stabilization of the iron control units being rejuvenated, with the chlorine feed counteracting the reducing action of the reducing agent and effecting disinfection of the ion exchange bed 12 in the tank 11.

As there is an inter-reaction between the chlorine and sodium hydrosulfite, it has been determined that the quantity of chlorine may be reduced if fresh water is introduced into the tank 11 for a short period of time between the introduction of the sodium hydrosulfite and the chlorinated water. To acomplish this the controls are positioned to open the water solenoid valve 32 in the soft water line 31 to permit rinse water from the soft water supply 30 to flow out through the station outlets 23 to each iron removal unit 10 being treated. It was also determined that only a small amount of rinse water flowing for a period of from approximately fifteen seconds to two minutes is sufficient to separate the more concentrated sodium hydrosulfite from the more concentrated chlorine solution.

Chlorine is fed by means of a feeder or pump 36 connected to a soft water header 37 at the junction T 38, with the chlorinated water controlled by solenoid valve 39 receiving a signal from a station control 41. The chlorine solution flows through a pipe 42 and a station outlet 23 communicating with the inlet of each tank 11 being treated. In this chlorination operation the period is preferably approximately 20 to 40 minutes, although additional time may be employed. The quantity of chlorine to be fed will vary depending upon the condition of the bed 12 of ion exchange material. Where organic matter is present this may create a demand over and above that required for sanitation purposes. While it is generally believed that 1 to 2 parts per million (p.p.m.) chlorine residual is sufficient for sanitation purposes, in many instances as much as 250 to 500 p.p.m. chlorine may be required to oxidize and burn out extraneous organic matter before the minimum of 1 to 2 p.p.m. chlorine residual can be maintained.

Upon termination of the chlorine period, the automatic control stops operation of the chlorine feeder or pump 36 and closes the chlorine solenoid valve 39 which stops the flow of chlorinated water. Immediately thereafter, the controls open the water solenoid valve 32 to permit soft rinse water to flow from the header 37 through branch lines 31 and the station outlets 23 to the iron removal units 10, with this soft water rinse removing any residual chlorine and assuring that the rejuvenated units will be delivered without a strong chlorine taste.

When the final rinsing operation has been concluded and preferably just prior to delivery of the units for installation and connection to the water supply systems and use, the pre-filter 13 is added to the top of the ion exchange bed 12 in the tank 11. Such filter material should have a hydraulic density less than that of the ion exchange material to permit easy and ready removal during the backwashing operation, and should also have a hydraulic density preferably just heavier than water so that this filter material will remain in a fairly loose state until it is settled by the initial downward flow of the service water to be treated.

By providing a filter material 13 that remains in a fairly loose or fluid state above the ion exchange bed 12, and due to its lower density than that of the exchanger, this filter material does not compact into a filter matrix which might shift as the unit 10 is being transported from a regeneration plant to the customer's home. Then when the initial flow of water passes through the unit 10, it causes a uniform settling of the bed and provides a uniform pre-filter mass on top of the bed 12.

Cellulosic material, such as highly refined wood pulp, and granular carbons are several of the materials having the proper combination of filtering characteristics and density suitable for use as pre-filtering materials, although it is understood that the present invention is not limited thereto but comprehends any materials having the desired properties and suitable for the purpose.

If a bactericidal material 14 is required, it is also added after the final rinse period and just prior to delivery of the units 10. One of such materials suitable for disinfecting purposes, is granular carbon impregnated with silver salts which release minute amounts of silver into the water. Another may be manganese treated cellulosic material. The presence of such bactericidal material on top of the bed in the unit 10, creates a bacterial static condition which eliminates objectionable characteristics of iron bacteria in the water.

The units 10 treated and regenerated as outlined above, are now ready for installation and replacement of exhausted units for treating water containing iron, the inlet supply of untreated water being connected to the inlet fitting 16 of the tank 11 of the iron removal unit 10, and the outlet fitting 17 of the tank being connected to the service line for supplying treated or conditioned water to the home.

The novel process, means and manner of reactivating and regenerating is suitable for treating and maintaining either ion exchange material that has been or has not been previously contaminated by iron bearing water.

The novel control system for carrying out the rejuvenation process comprises but two major control means, one of which is the master control 29 and the other one or more station controls 41 (FIGS. 2 and 3). One master control is employed with from one to ten station controls, the latter being similar so that a description of one will suffice for an understanding of the invention. The principal function of the master control 29 is to control the amount and concentration of the brine as well as the added reducing agent, when present, and to direct the flow to the proper station control, while the station controls 41 operate directly a brine solenoid valve 28, a water solenoid valve 32 and the chlorinated water solenoid valve 39.

Referring more particularly to the rejuvenating system and manner of operation, a station control 41 permits the brine signal from the master control 29 to go directly to the brine solenoid valve 28 which has power leads connected to a receptacle or outlet 43 in the station control.

During this period, the brine signal is also employed to prevent the opening of the water solenoid valve 32 and the chlorinated water solenoid valve 39 through the action of the relays 44, 45 and 46 and the timer 47 of the station control. During brining the relay 45 is energized by the brine signal whereby contacts 48 of this relay are opened and the circuit to the water solenoid valve 32 is broken, preventing water from flowing to the station outlet 23.

During the brining cycle or operation (which includes any added reducing agent), the master control 29 sends a second signal to the station control 41 which energizes the relay 44, opening its contacts 49 whereby to interrupt the current flow to the chlorinated water solenoid valve 39 and prevent flow from reaching the station outlet 23. Also during this brining cycle the brining period relay 46 is not energized and its normally closed contacts 51 remain closed and its normally open contacts 52 remain open, thereby interrupting the flow of current to the chlorine feeder or pump 36 and preventing operation of the latter.

During the entire brining period the station control timer 47, which is manually set to a predetermined time period when the brine meter 25 is set, has its contacts 53 and 54 closed. These two contacts are connected in series with the leads from the chlorinated water solenoid valve 39 and the water solenoid valve 32, respectively, but as the above mentioned relay contacts 48, 49 and 52 are open, these two solenoid valves 39 and 32 remain closed. Thus as long as there is a continuous brine signal from the master control 29, only the brine solenoid valve 28 is open and the solenoid valves 32 and 39 and the chlorine feeder 36 remain inoperative.

When a predetermined quantity of brine has flowed through the batch meter 25, the contacts 55 in a brine meter switch 56 open and the brine signal to the station control 41 is interrupted. This closes the brine solenoid valve 28 and the relay contacts 48 which energize the water solenoid valve 32 causing water to flow out of the station outlet 23. Simultaneously, the second signal which goes to the relay 44 of the station control 41 is also interrupted. This relay 44 is a thermal delay relay and its contacts 49 remain open for approximately fifteen seconds to two minutes, after which these contacts of the relay 44 close and start the chlorinated water rinse period for sanitation purposes.

With the normally closed contacts 49 closed, current is now free to energize the chlorinated water solenoid valve 39 and the relay 46, causing the normally closed relay contacts 51 to open and the normally open relay contacts 52 to close. As the latter contacts close, the circuit to the chlorine feeder or pump 36 is completed and the feeder pumps chlorine into the T junction or T 38 of the soft water header 37 and chlorinated water then flows through the chlorinated water solenoid valve 39 in the line or pipe 42 to a station outlet 23, the valve now being open due to the fact that the relay contacts 49 are closed and the contacts 53 of the station control timer 47 are closed, thereby completing the circuit.

During the period when the relay 46 is energized, contacts 51 are open and the circuit to the water solenoid valve 32 is interrupted. The signal from the meter 25 which initially energized relay 45, now being interrupted, permits the contacts 48 to close and these contacts remain closed during the remaining cycles or operations performed by the station control 41.

After a predetermined time interval, the contacts 53 of the timer 47 open and thus interrupt current flow to the chlorinated water solenoid valve 39 causing the latter to close and interrupt current flow to the relay 46, opening the contacts 52 and stopping flow from the motor-operated chlorine feeder or pump 36. Contacts 51 are also closed thereby completing the circuit to the water solenoid valve 32 and causing the latter to open and permit the flow of water through the header 37 and branch lines 31 to the station outlet 23. After a predetermined time period, the contacts 54 of the timer 47 open and the signal to the water solenoid valve 32 is interrupted whereupon this valve closes and stops the flow of water.

It will thus be evident that each station control 41 is controlled by the master control 29 as long as brine and the secondary electrical signal are directed to it. Once the brine and the other signal are interrupted from the master control, the station control takes over completely the sequence and timing of the remaining cycles or operations.

FIG. 3 of the drawings discloses the wiring diagram for the iron maintenance system with the circuits in the master control 29 disposed at the left and the circuits for the station control 41 to the right. In the operation of the master control 29, current from a suitable 110 v. power source at 57 enters the control at the terminal 58 and is fed to a main switch 59 through the line 61. The main switch 59 simply controls the main power source or line to the control system, with current flowing from this switch through a line 62 to the brine meter switch 56 connected in shunt arrangement across the terminals of a receptacle or outlet 63. The meter switch 56 is closed whenever a predetermined quantity of brine is set on the meter 25 and opens when the measured quantity of brine has been exhausted.

With the brine meter switch 56 closed, current flows to the brine selector switch designated generally by the reference numeral 64, and to the station selector switch designated generally by the reference character 65. The brine selector switch 64 comprises a double pole, double throw switch, while the station selector switch 65 comprises a two-gang, multi-contact switch, the first gang of which is designated 65$^a$ and the second 65$^b$. Current flowing to the terminal 66 of the second gang 65$^b$ of the station selector switch 65 is directed to the station control relay 44 through the wire or line 67 connected to the terminal 68 of a barrier terminal mounted on the rear panel 69 of the station control 41. The wire or line 71 from the terminal 72 connects with a jack of a multi-wire connector mounted in the station control 41.

Current flowing through a wire or line 73 to the brine selector switch 64, may be directed to either the upper contact 74 or lower contact 75 of this switch. When current flows through contact 74 and wire 76, it flows to the terminal of the first gang 65$^a$ of the station selector switch 65 where it is directed to contact 77 of the first gang, and flows through the connected wire to the terminal 78 of the barrier terminal on the rear of the panel 69 of the station control 41. Current flows from the terminal 78 to the terminal 79 and jack of a multi-wire connector and furnishes a continuous signal to relay 45 as previously described.

In the event current flowing through the line 73 connected with the brine selector switch 64 is directed to the lower contact 75, this current flow through the line 81 energizes the motor of a percentage timer 82 containing a switch 83 which interrupts the current flow at constant intervals, with the interruption period capable of being varied so that definite ratios of interruption can be established. Thus current flow from the contact 75 through the wire 81 to terminal 84 of the timer switch 83 furnishes an interrupted signal to the station selector switch 65 and causes relay 45 to energize and deenergize thereby opening and closing the water solenoid valve 32. Thus the water solenoid valve 32 is open during the "off" period of timer switch 83, and the brine solenoid valve 28 is open during the "on" period of this timer switch.

It will be apparent that by controlling the ratio of brine and water, the dilution of the brine may be carefully and positively controlled. For example, if the brine is on 25% of the time and water is on 75% of the time, then the concentration will be 25% of saturation or, if these figures are reversed, the concentration will be 75% of saturation. This method of dilution is believed to be unique for it is completely independent of the flow at the station outlet, and it does not matter whether one or more station outlets 41 are being used, as dilution depends merely upon a ratio rather than a flow and predetermined flow rates are preferred for each individual unit 10. As the flow rates for individual units are small, and the total time cycle "off" and "on" is small, mixing of brine and water occurs in the free board space 15 above the ion exchange bed 12 in each iron removal unit 10. Additional mixing occurs in the top portion of the ion exchange bed.

In the master control 29, pilot lights are used to identify the control operation or operating cycles. A white pilot light 85 is provided to indicate to the operator that the power or main switch 59 is closed. A red pilot light 86 indicates that the brine selector switch 64 is set for a continuous signal which gives saturated or concentrated brine, and receives its current from contact 74 and is grounded at contact 87. An amber pilot light 88 indicates that the brine selector switch 64 is in position for preparing diluted brine and it receives its signal from its contacts 75 and 89.

A suitable pilot light 90 is provided for indicating operation of the chlorine feeder.

The drawings show that the master control 29 has an electrical receptacle or outlet 43 connected across the terminals of the station selector switch 65 and a ground connection 91 to provide current for operating the motor of the sodium hydrosulfite feeder 33 when it is connected by the usual plug 92 to the receptacle 43. The brine signal, whether continuous from the contact 74 or interrupted from the timer switch 83, supplies the current for operating the feeder 33 during the period when the brine is flowing. The sodium hydrosulfite is pumped through the tube 34 (FIG. 2) from a receptacle or container 93, into the junction T 35 of the brine header 26 and provides a reducing chemical within the brine solution in order to remove oxygen from solution which can cause iron precipitation.

In each station control 41 there are also multiple pilot lights, a red pilot light 94 connected across the brine solenoid 28, a blue pilot light 95 connected across the chlorinated water solenoid 39, and a green pilot light 96 connected across the water solenoid 32, to signal their operation. Convenience outlets 43 and plugs 92 are provided for ready connection and disconnection of the solenoid leads, and also for the brine meter switch 56 (receptacle 63) and for the chlorine feeder 36.

A switch 97 is a simple "on-off" type switch in series with the chlorinated water solenoid 39, and may be used to shut off or eliminate the chlorinated water cycle from the rejuvenation operation if the controls are used for another purpose. A switch 98 is employed as a selector switch between manual operation when moved to contact 98$^a$, and automatic operation when moved to contact 98$^b$ of the controls. A timer motor 99 is provided at each station 41 associated with the timer switches designated by the contacts 53 and 54.

With further reference to FIG. 2 of the drawings, the novel system includes multiple manually controlled valves 101 and check valves 102, and the chlorine feeder or pump 36 is provided with a container 103 for the chlorine solution which is pumped into the chlorine-water header 104 through a tube 105. Current for operating the feed pump 36 is supplied from a junction box 106 having a convenience outlet 43 and a detachable plug 92.

Contacts 107, 108, 109, 111, 112 and 133 are provided with the latter three contacts provided on a multi-wire connector on each of the station controls 41, for supplying current from the power source 57 for operating the relays 43, 44 and 45, pilot lights 90, 94, 95 and 96, switches of the timer 47 and its motor 99, selector switch 98 and chlorine feeder 36, all on the station controls 41.

As an example but not to be construed as limiting the present invention, excellent results have been obtained using portable service-type tanks 11 having a diameter of approximately seven inches with approximately one cubic foot of ion exchange material, as well as with tanks having a diameter of approximately nine inches and one and one-half cubic feet capacity. Regeneration flow rates of approximately 0.25 g.p.m. (gallons per minute) for the smaller units and approximately 0.35 g.p.m. for the large units is sufficient to maintain approximately the same contact time with the brine.

Approximately six gallons of concentrated brine is generally sufficient for a seven inch unit and approximately eight and one-half to nine gallons of concentrated brine at the recited flow rates for the larger unit.

Approximately three hundred (300) p.p.m. (parts per million) of sodium hydrosulfite solution is introduced during brining to assure that iron exchanged from the bed remains soluble and is discharged to waste.

Chlorine solution of approximately 250 p.p.m. for disinfection is fed during the initial part of the rinse cycle and as the iron has been removed previously, there is eliminated any danger of iron fouling and color-throw.

After the regeneration cycles and rinsing have been completed, the cellulosic filter material which preferably consists of a high grade wood pulp for filtering out precipitated or insoluble iron, is added as a slurry with approximately five quarts of slurry being sufficient for approximately twenty units. Thereafter the units are ready for reuse and after a predetermined period of time, again require rejuvenation.

While excellent results have been obtained by the use of sodium hydrosulfite as the reducing agent and its use is preferred, other reducing agents, such as sodium bisulfite, sodium sulfite, sodium nitrite, sodium thiosulfate and hydrazine may be added to the brine. We have also found that adding a sequestering agent to the brine, such as polyphosphates and particularly sodium hexametaphosphate or tetrasodium Versenate, mintains the soluble iron from precipitating during regeneration.

Having thus disclosed the invention, we claim:

1. A process for rejuvenating portable iron removal units removed from the place of use to a regenerating plant and each iron removal unit containing a bed of ion exchange material for removing soluble iron and filter material for removing precipitated iron from iron bearing water, comprising the steps of backwashing the contents of the tank to remove the filter material and contained precipitated iron from the unit, treating the backwashed bed of ion exchange material with a controlled quantity and concentration of brine and approximately 300 parts per million sodium hydrosulfite, rinsing the ion exchange material with water, passing approximately 250 parts per million chlorinated water through the bed of ion exchange material, and rinsing the chlorine from the bed.

2. A process for rejuvenating portable iron removal units as set forth in claim 1, including the step of adding a fresh supply of filter material and a layer of bactericidal filter material to each unit prior to reuse.

3. A process for rejuvenating portable iron removal units removed from the place of use to a regenerating plant and each iron removal unit containing a bed of ion exchange material for removing soluble iron and filter material for removing precipitated iron from iron bearing water, comprising the steps of backwashing the contents of the tank to remove the filter material and contained precipitated iron from the unit, treating the backwashed bed of ion exchange material with a controlled quantity and concentration of brine and a sequestering agent, rinsing the ion exchange material with water, passing a controlled quantity of chlorinated water through the bed of ion exchange material, rinsing the chlorine from the bed, and adding a layer of cellulosic filter material and a layer of granular carbon impregnated with silver salts to each unit prior to reuse.

4. A process for rejuvenating portable iron removal units as set forth in claim 3, in which the sequestering agent is sodium hexametaphosphate.

References Cited in the file of this patent

UNITED STATES PATENTS

| | | |
|---|---|---|
| 1,914,333 | Staegmann | June 13, 1933 |
| 1,966,279 | Behrman | July 10, 1934 |
| 2,351,160 | Stone et al. | June 13, 1944 |
| 2,510,855 | Bauman | June 6, 1950 |
| 2,554,163 | West | May 22, 1951 |
| 2,571,271 | Marks | Oct. 16, 1951 |
| 2,572,082 | Welsh | Oct. 23, 1951 |
| 2,666,741 | McMullen | Jan. 19, 1954 |
| 2,681,147 | Braswell | June 15, 1954 |
| 2,684,942 | Tice | July 27, 1954 |

OTHER REFERENCES

McGarvey et al.: "Chemical Engineering," vol. 61, No. 9, September 1954, pages 205–208.

Chemical Abstracts, volume 49, October-November 1955, page 14239b, Liberation of Iron from Zeolite, Kitsuta (Japan 5370 (1954), Matsubara).

UNITED STATES PATENT OFFICE
CERTIFICATE OF CORRECTION

Patent No. 3,078,224                                    February 19, 1963

Robert E. Schulze et al.

It is hereby certified that error appears in the above numbered patent requiring correction and that the said Letters Patent should read as corrected below.

Column 3, line 68, for "iron" read -- ion --; column 10, line 45, for "133" read -- 113 --.

Signed and sealed this 10th day of September 1963.

(SEAL)
Attest:

ERNEST W. SWIDER                                          DAVID L. LADD
Attesting Officer                                            Commissioner of Patents